United States Patent
Du

(10) Patent No.: US 9,460,429 B2
(45) Date of Patent: Oct. 4, 2016

(54) GPS-BASED TOLL COLLECTION SYSTEM AND METHOD

(71) Applicant: iDiggApp Inc., Sugar Land, TX (US)

(72) Inventor: Hao Du, Sugar Land, TX (US)

(73) Assignee: iDiggApp Inc., Sugar Land, TX (US)

( * ) Notice: Subject to any disclaimer, the term of this patent is extended or adjusted under 35 U.S.C. 154(b) by 0 days.

(21) Appl. No.: 14/462,964

(22) Filed: Aug. 19, 2014

(65) Prior Publication Data

US 2016/0055466 A1 Feb. 25, 2016

(51) Int. Cl.
| | |
|---|---|
| G06Q 20/14 | (2012.01) |
| G06Q 50/30 | (2012.01) |
| G01S 19/13 | (2010.01) |
| G07B 15/06 | (2011.01) |
| G06Q 20/32 | (2012.01) |

(52) U.S. Cl.
CPC ............ *G06Q 20/145* (2013.01); *G01S 19/13* (2013.01); *G06Q 50/30* (2013.01); *G06Q 20/3224* (2013.01); *G07B 15/063* (2013.01)

(58) Field of Classification Search
CPC ........................... G06Q 20/3224; G07B 15/00
See application file for complete search history.

(56) References Cited

U.S. PATENT DOCUMENTS

| | | | |
|---|---|---|---|
| 5,490,079 A | 2/1996 | Sharpe | |
| 8,634,804 B2 | 1/2014 | Mcnamara | |
| 9,053,633 B2* | 6/2015 | Breed ................... | B60W 30/16 |
| 2005/0097018 A1* | 5/2005 | Takida ................ | G06Q 20/102 |
| | | | 705/35 |
| 2010/0287038 A1* | 11/2010 | Copejans ............. | G07B 15/063 |
| | | | 705/13 |
| 2012/0215594 A1* | 8/2012 | Gravelle .............. | G07B 15/063 |
| | | | 705/13 |
| 2014/0025444 A1* | 1/2014 | Willis ................ | G06Q 20/3272 |
| | | | 705/13 |
| 2014/0244365 A1* | 8/2014 | Price ...................... | G07B 15/00 |
| | | | 705/13 |
| 2014/0278838 A1* | 9/2014 | Novak ................. | G07B 15/063 |
| | | | 705/13 |
| 2015/0161578 A1* | 6/2015 | Ahmed ................... | G07F 17/24 |
| | | | 705/40 |

OTHER PUBLICATIONS

Toll Track, available at http://www.tolltrack.co.za (last visited on Aug. 19, 2014).
PayUrToll mobile application, PayUrToll, LLC, available at http://www.payurtoll.com (last visited on Aug. 19, 2014).
American Roads Technologies, available at http://www.amrdstech.com/ (last visited on Aug. 19, 2014).

* cited by examiner

*Primary Examiner* — Todd Melton
(74) *Attorney, Agent, or Firm* — Timothy Wang; Ni, Wang & Massand, PLLC

(57) ABSTRACT

An automatic toll collection system includes a mobile app that receives a plurality of toll gantry information from a database, reads GPS location data received from the mobile device hosting the app, and creates a plurality of trip segments using the GPS location data and time stamp. The system then determines whether the mobile device is travelling on a road where toll ought to be collected by comparing the trip segments with the toll gantry information. If the vehicle is passing through a gantry or toll road, the system will then calculate toll charges based on the trip segments and gantry information, generate a toll charge transaction, and notify the mobile user of the toll charge.

13 Claims, 8 Drawing Sheets

GPS-BASED TOLL COLLECTION SYSTEM AND METHOD

BACKGROUND OF THE INVENTION

The system and method disclosed herein are generally related to electronic toll collection systems, and more specifically to a GPS-based toll collection system that uses a mobile app.

Currently, tolls on toll road are collected either manually or through some Electronic Toll Collection ("ETC") system. Normal toll roads consist of a web of connected roads. Under normal circumstances, a vehicle can only enter or exit the toll roads through ramps, which connect free roads to toll roads. Tolls can be collected manually while vehicles entering or exiting the toll roads. ETC systems have been invented to replace the manual process and collect tolls by reading a RFID chip mounted on the vehicles. In an ETC system, RFID readers are mounted on gantries that are built cross entering ramps, exiting ramps, or main lanes of the toll roads. When a vehicle passes through a gantry, the RFID reader will receive electronic signal sent by REID chip on the vehicle, and then debit toll amount from the user account associated with the RFID chip. Some ETC system has image/video capture equipment mounted on the gantries. The image/video capture device captures images or video of a vehicle when the passing vehicle does not have a REID chip, or when the system failed to read or identify the vehicle. The images or video will then be processed to get the license plate, and toll invoice will be sent to the vehicle owner based on registered information associated to the license plate. ETC system requires a great amount of capital, and time to build, install, and calibrate the whole system.

Some European tolling systems have relied on a combination of global positioning sensors, terrestrial sensors for error correction, and cellular communications systems for billing. The systems use GPS technology to track logistical vehicles, such as commercial trucks, to calculate tolling fees based on distance traveled. Because of the inherent errors in such GPS sensors, the systems also combined terrestrial sensors at key locations to verify the accuracy of GPS sensor readings. Such terrestrial sensors require extensive capital and time and must be regularly placed to assure accurate capture of information. Furthermore, the systems require each vehicle be equipped with GPS sensors, terrestrial sensors, and a cellular communications device to communicate the captured GPS information so that the vehicle may be billed for the road usage.

SUMMARY

The system disclosed herein includes a mobile app and a supporting server that use GPS readings from a mobile device to determine toll road usage and manage toll payments accordingly. An exemplary system first includes a GPS reading unit/program that utilizes a mobile device to collect location information, such as latitude, longitude, altitude, speed, or direction, etc., when the mobile device is moving with a vehicle. It includes a first database that stores user information of the toll collection system and a second database that stores information of toil gantries. The collected information can be processed by a control unit that creates a plurality of trip segments in real time. The trip segments are used to determine whether the vehicle is on a toll road or fee required area. Another toll collection unit calculates toil charges based on said plurality of trip segments and gantry information, and notifies user of the mobile device on the toll charge transaction. The toll collecting unit further communicates via a network connection with a toll road reinforcement system and/or a backend server regarding the toll charge transaction. The real time processing requires Internet communication between the mobile device and supporting server(s). If such communication is not available, the location reading information can be saved on the mobile device and processed in later time when the communication to the supporting server(s) becomes available. While the vehicle is moving, alerts in different formats, such as text message, voice/sound, or images/video, will be shown on the mobile device to inform the toll road user for any events, including but not limited to entering toll road, passing through a booth/gantry or certain actual or virtual landmark and existing toll road. Furthermore, the system utilizes an error correction algorithm to ensure the GPS reading data used for calculations is correct or had readings are detected and discarded.

The invention provides a compelling solution to the problem of providing accurate toll road usage and correct billing amounts without the need for complex and expensive systems. The disclosed invention uses already ubiquitous mobile devices, such as the omnipresent smart phone with GPS tracking and cellular communications systems, to replace capital intensive physical detection systems such as gantry mounted RFID ETC systems. Presently such ETC systems are prohibitively expensive, and limited to their physical locations. The present system solves this by relying on preexisting systems to create a satellite based toll detection and collection system. This solves the problem of requiring costly and geographically limited RFID and image processing systems. Furthermore, it solves the problem experienced by other GPS based toll systems by the use of an algorithm to improve the accuracy of the GPS readings of the mobile device, thus allowing for accurate tracking and billing without the need for costly terrestrial sensors to assist with error correction.

In one preferred embodiment, the system utilizes a mobile device to collect GPS location information, such as latitude, longitude, attitude, speed, direction, etc., while the mobile device is moving with a vehicle. This information is used to correctly bill for usage of a toll road based on an existing toll gantry system. The invention uses an algorithm to accurately determine the usage of toll roads based on the GPS information captured, including at least longitude, latitude, and a timestamp. The algorithm uses two or more captured GPS coordinates and time stamps to calculate the vehicles travel in relation to an existing toll gantry system. The location information is transmitted via cellular network to servers, which determine if the vehicle is on a toll road or in a fee required area, and determines the fee accordingly. If no network is available, the location information can be stored for later transmission. The location information collected by the mobile device is used to determine if the vehicle is passing through a toll gantry, and collects tolls electronically at the applicable rate if so.

This system determines vehicle locations using the globally available GPS system and eliminates the use of RFID chip and reader to collect tolls. Other than GPS-enabled mobile devices, there is no real gantry or other equipment required to implement the inventions. However, some of the existing infrastructures such as lane control cameras can still be used to capture vehicle information if there is no capable mobile device available on the vehicle or the toll collection system malfunctions.

DETAILED DESCRIPTION

The following description provides details with reference to the accompanying drawings. It should be understood that the invention may be embodied in many different forms and should not be construed as limited to the embodiments set forth herein.

Figure 1:
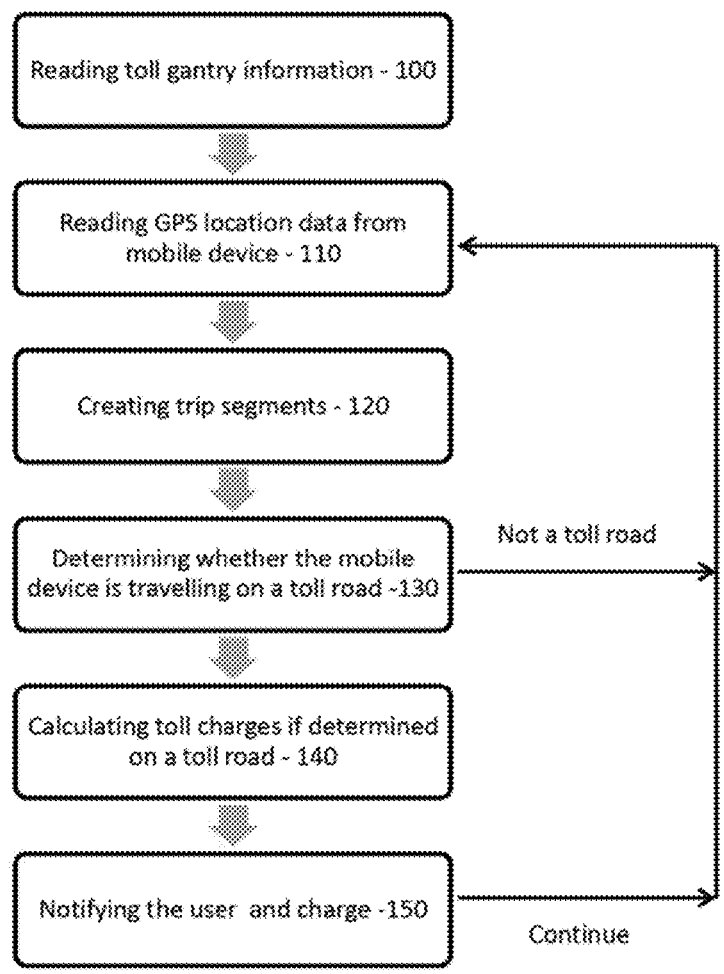
FIG. 1 is a flow chart showing the process of using an exemplary system for automatic toll collection.

FIG. 1 shows the typical process of automatic toll collection according to one preferred embodiment of the system. The mobile app first receives a plurality of toll gantry information from a database, residing either locally in the mobile device or remotely from a backend server (100). It then reads GPS location data received from the mobile device hosting the app (110). Based on the GPS location data, a plurality of trip segments was created, and the direction of travel and other information are also calculated using both the GPS location data and time stamps (120). The system then determines whether the mobile device is travelling on a road where toll ought to be collected by comparing the trip segment information with the toll gantry information (130). If the vehicle is passing through a gantry or toil road, the system will then calculate the time when the vehicle is passing through a gantry or toll road reinforcement point. If the vehicle is not on a toll way, the system will then continue reading GPS location data from the mobile device (110) and make continuous calculations to determine whether the vehicle is on a toll road. If the vehicle is already on a toll road, the system will further calculate toll charges based on said plurality of trip segments and gantry information (140). The system will generate a toll charge transaction, and notify the mobile user on the toll charges (150). In the meantime, it may also communicate the transaction with a toll road reinforcement system through a network connection.

In one preferred embodiment, the toll gantries are virtual gantries stored in a database. Yet in another preferred embodiment, the system uses information of real gantries in an existing toll collection system. The GPS information received from the mobile device typically includes longitude, latitude, and altitude information. Other information such as the travel speed and direction could also be retrieved or calculated. To ensure accurate operation of the system, getting accurate and reliable GPS data is the key. The system further incorporates the step of error detection that identifies faulty GPS readings of the mobile device's locations. It discards or forgives identified faulty GPS readings to some tolerable level. By improving the quality of the input GPS data, the system can make reliable determination regarding the user's travel on a toll road and the proper toll charges.

Figure 2:
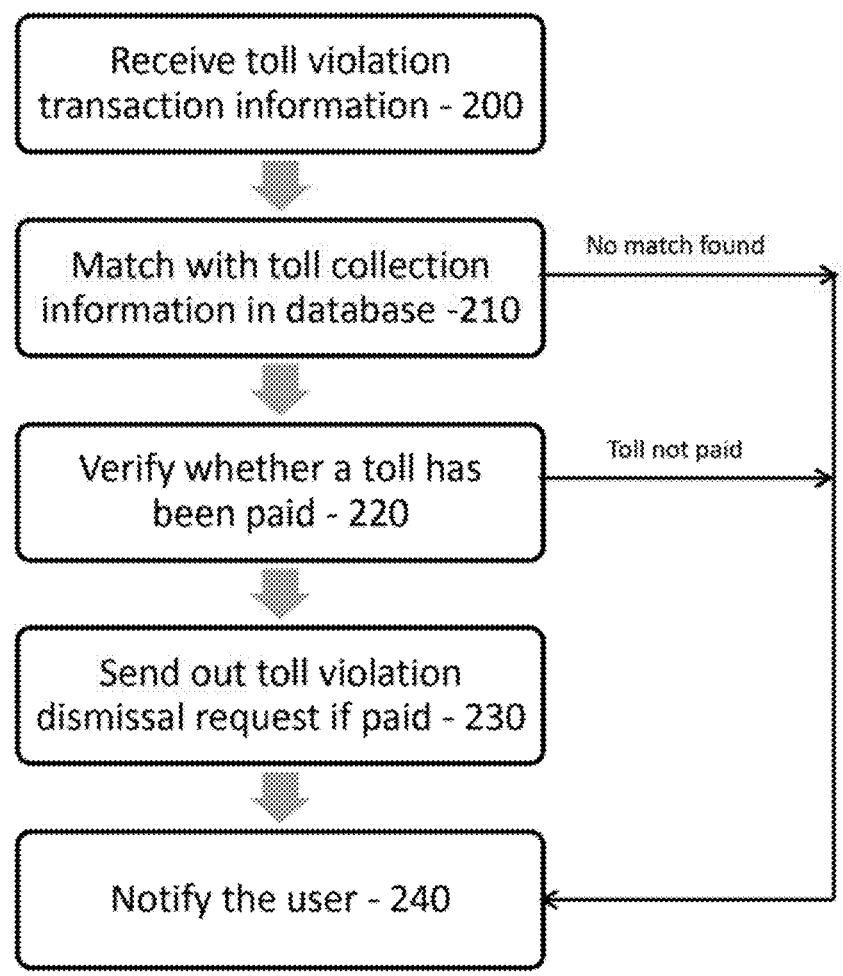
FIG. 2 is a flow chart showing the additional steps for processing toll violation transactions.

In another preferred embodiment as shown in FIG. 2, the system can also be used to handle toll violation transactions collected by current ETC toll collection systems. For example, some ETC system has image/video capture equipment mounted on the gantries. The image/video capture device captures images or video of a vehicle when the passing vehicle does not have a RFID chip, or when the system failed to read or identify the vehicle. The images or video will then be processed to get the license plate, and a toll violation transaction is generated. Currently toll violation transaction must be handled and verified by toll way authority personnel. An invoice will be sent to the vehicle owner based on registered information associated to the license plate. Using the inventions disclosed herein, a toll violation transaction can be processed automatically. The additional steps first include receiving toll violation transaction information from a toll road reinforcement system (200). It then matches the violation transaction information with information in toll charge transactions already processed by the invented system (210). The matching results are typically recorded in a database (220). The app also notifies the user of the result of the matching of the violation transaction and toll charge transaction (240). If there is a match and the toll is already paid using the app, the results will be stored in the database and the corresponding toll violation transaction or ticket will be dismissed (230).

Figure 3:
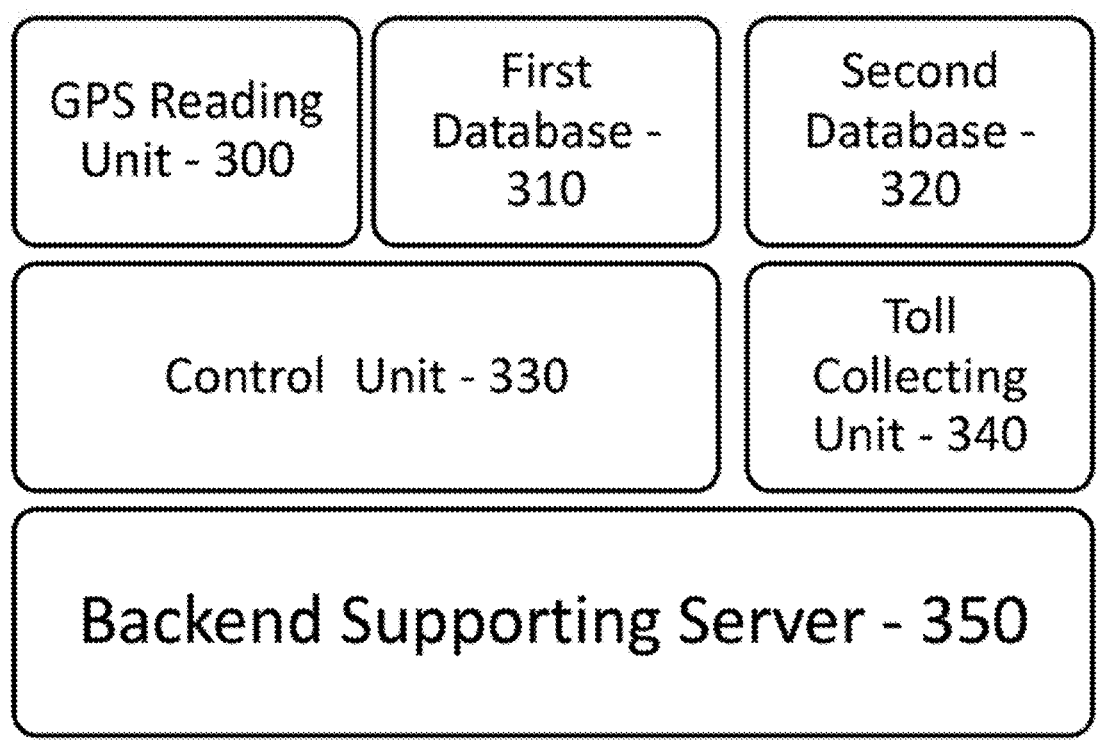
FIG. 3 is a system diagram showing the main functioning units of an exemplary system.

FIG. 3 depicts the main functioning units of a preferred embodiment of the present systems. It typically includes a GPS Reading Unit (300) that includes software programs or modules for retrieving GPS data from a mobile device. The system further includes a first database (310) that stores the user information of the toll collection system and a second database (320) for storing information of the toll gantries. The toll gantries information stored in the database could refer to real toll gantries or virtual toll gantries. The first database and second databases could also refer to tables residing in one single database system or data file. A control unit (330) includes software program or module that creates a plurality of trip segments based on the GPS information received. Using the trip segments created and gantry information, it could then determine whether the mobile device is traveling on a route where tolls ought to be collected. The system further include a toll collecting unit (340) that calculates toll charges based on the trip segment and exact time when the vehicle moves through the gantries. The app will creates a toll charge transaction, then notify the user on the toll charge. The toll collecting unit will communicate via a network connection and send information of the toll charge collection to a toll road reinforcement system and/or a backend supporting server. A toll road reinforcement system is a toll charge system owned or operated by the toll way authority or company. The backend server hosts the database for the toll charge transaction and could conduct other operations as well. The back server could also act as the intermediate agent for the communication with the toll road reinforcement system.

Figure 4:
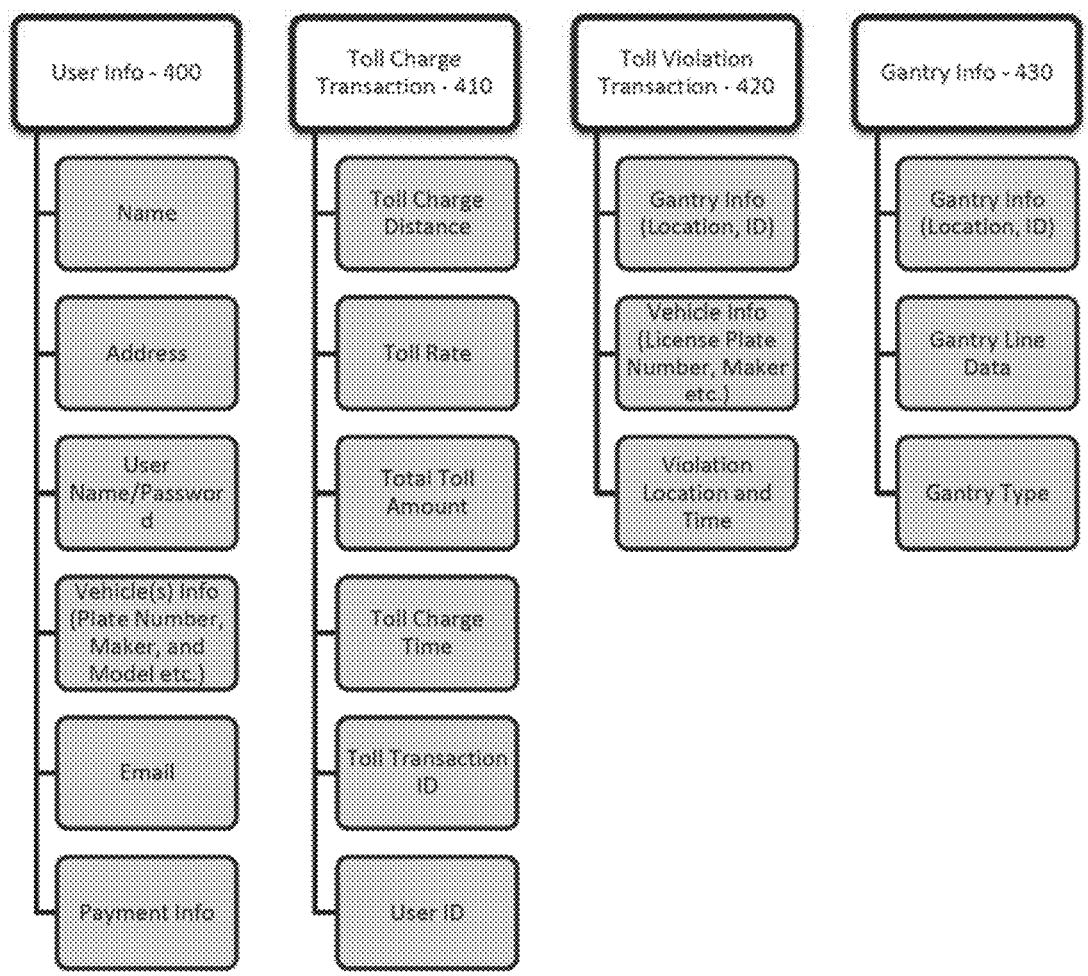
FIG. 4 is a diagram showing an exemplary database design for tracking user information, toll charge transactions, toll violation transactions, and gantry information.

FIG. 4 is an exemplary database table design for the database hosting the user information, toll charge transactions and/or toll violation transactions, and gantry information. For example, a User Info table (400) may include data columns for name, address, user name/password, vehicle info such as license plate, maker, and model etc., email, payment information, and other necessary information. The Toll Charge Transaction table (410) typically includes data columns for toll charge distance, toll rate, total toll amount, toll charge time, toll transaction id, the user ID, and other payment information. The Toll Violation Transaction table (420) stores toll violation tickets information received from an existing toll road reinforcement system. It typically includes information for the gantry where violation occurred. A toll violation ticket may also include the vehicle information including the license plate number, maker/model, and etc. It also includes the toll violation location and time. A typical table for Gantry info (430) includes the gantry location. ID, and the type of gantry (i.e., main gantry, on ramp gantry, or off ramp gantry etc.). It also includes the gantry line data, which typically constitutes of spatial data such as lines or points. Alternatively, the Gantry Info table (430) could store the longitude and latitude values of each gantry without using spatial data, the processing of which could be time consuming.

Figure 5:
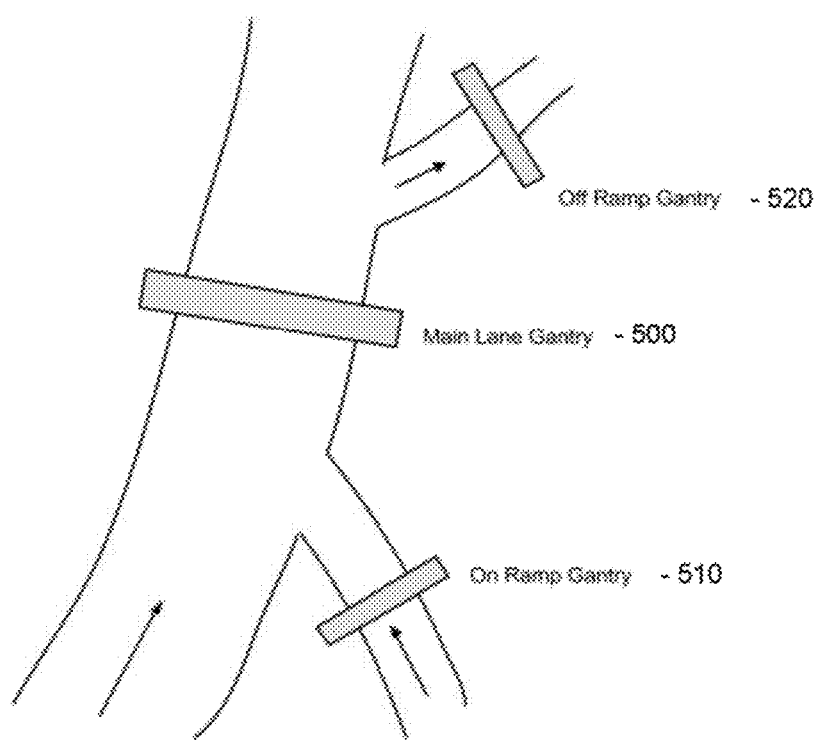
FIG. 5 is a diagram of a toll gantry system including ingress, egress, and main gantries for tracking toll usage and billing.

FIG. 5 illustrates a section in a typical gantry system. There are generally three types of toll collecting gantries, main lane gantry (500), on ramp gantry (510), and off ramp gantry (520). A main lane gantry ran across the main lane of a toll road. An on ramp gantry serves as the entry point to enter a toll road, while an off ramp gantry serves as the exit point of leaving the toll road.

Figure 6:
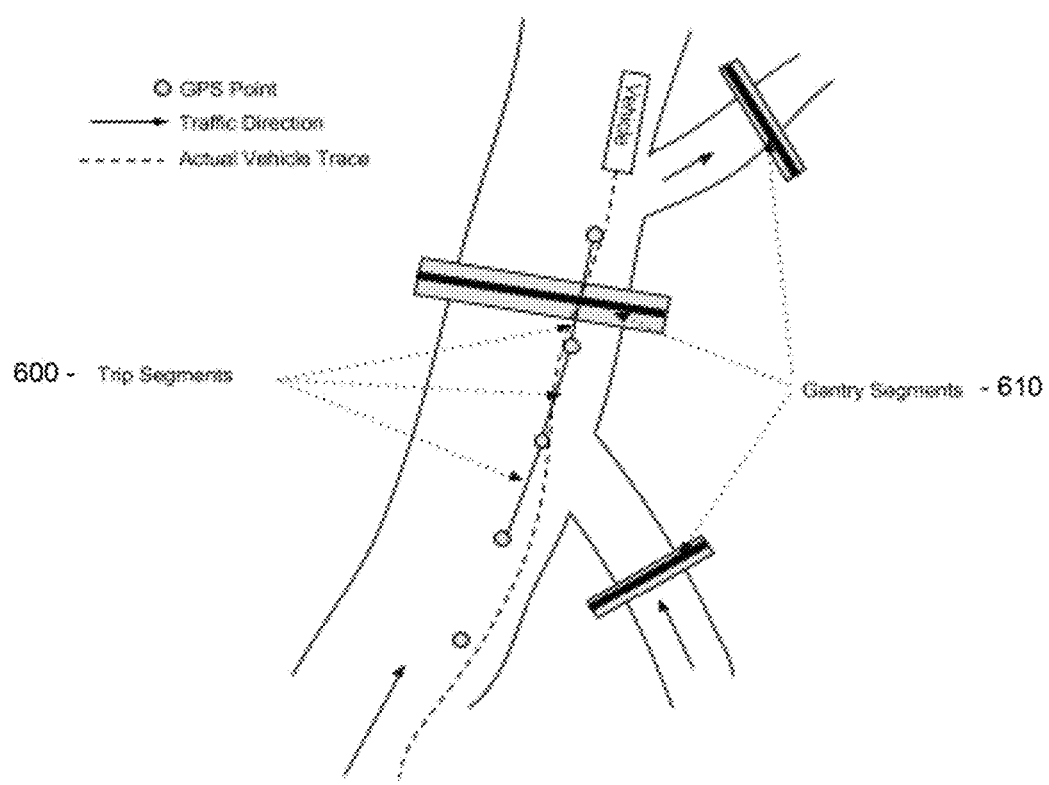
FIG. 6 is a diagram showing how an exemplary system uses GPS location readings coupled with gantry information to determine whether a vehicle is traveling on a toll road.

FIG. 6 depicts how a preferred embodiment uses GPS location readings coupled with gantry information to determine whether a vehicle is travelling on a toll road. It determines toll road usage of a vehicle by checking if the vehicle passing through any of the gantries. However, due to the current limitation in GPS accuracy; it is not possible to determine when exactly the vehicle is passing through the gantry. For example, a vehicle travels 80 miles per hour, while the mobile device read GPS location every second. The distance traveled by the vehicle in a second is 117.3 feet, which is multiple times of the width of a gantry. Pinpointing the exact time of passing through a gantry is difficult. What the app does is to create a segment by connecting two of GPS location points. This segment is referred as a trip segment (600). A gantry can be represented by another segment, which is referred as a gantry segment (610). When an intersection point exists between a trip segment and a gantry segment, the mobile device, also the vehicle, passed through the gantry, if the two GPS points collected by the mobile device is accurate enough. An event when a vehicle passes through a gantry will be referred to as a hit. The direction of the vehicle can be determined by comparing the timestamps of two consecutive GPS locations.

The algorithm disclosed in FIG. 6 and associated description also works with the existing toll collection structure, i.e. travelers pay tolls when their vehicle passes certain toll collection points, such as ETC enabled gantries or manual toll booths.

In current toll collecting systems, tolls are collected when a vehicle passing through a gantry, i.e., toll collecting point. The toll amount normally is calculated based price per mile traveled by various classes of vehicles between two toll collecting points or between one toll collecting points to the end of the toll road. Gantries are normally located at entrance, exit or main lanes of the toll roads. This algorithm follows the current toll collecting structure and only collect when a vehicle passing through a gantry. This will allow toll road operators to use existing toll collection structure and existing facilities without interrupting current business flows.

Figure 8:
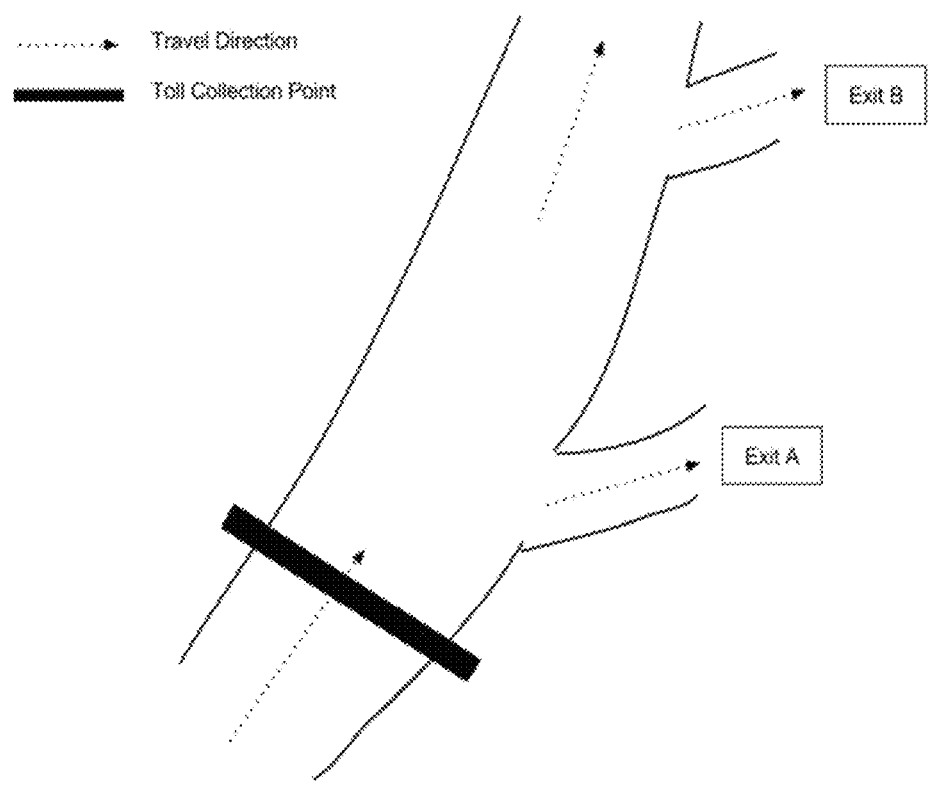
FIG. 8 is a diagram showing a segment in an existing toll collection system with real gantries.

The toll amount is usually determined by the distance the vehicle traveled on the toll road before reaching a toll collection point, (or after paying a toll). Depending on the design and locations of toll collection points and how the travelers use the toll road, the travelers may overpay or underpay the uses of toll road as the actual travel distance on the toll road are not considered. For example, a traveler drives on a toll road designed as shown in FIG. 8. The toll amount is fixed at the toll collection point for the traveler regardless whether the traveler take Exit A or Exit B. The toll per unit distance will be higher if the traveler takes Exit A. It is impossible to precisely determine the toll amount based on actual distance traveled on the toll road using the existing toll collection structure and infrastructure. In order to treat all travelers the same and charge them only based on distance travelled on the toll road, the present system uses the mobile device that continuously collect location information while traveling. The continuous location information will be used to calculate actual distance travelled by the traveler. Therefore, toll amount can be calculated accordingly based on a fixed cost per unit distance travelled if needed.

The proper operation of the present system depends on the accuracy of the GPS reading. GPS system's accuracy on determining latitude and longitude of the mobile device is affected by not only the hardware and software configuration of the mobile device, but also the environment around the location, such as buildings and the weather. In many instances, the GPS location obtained from a mobile device cannot determine whether the mobile device is on a route of toll road or whether it is passing through a gantry or not. Algorithms have been developed to accurately determine the usage of toll road based on GPS information. The GPS information contains at least latitude, longitude and timestamp when received.

Figure 7:
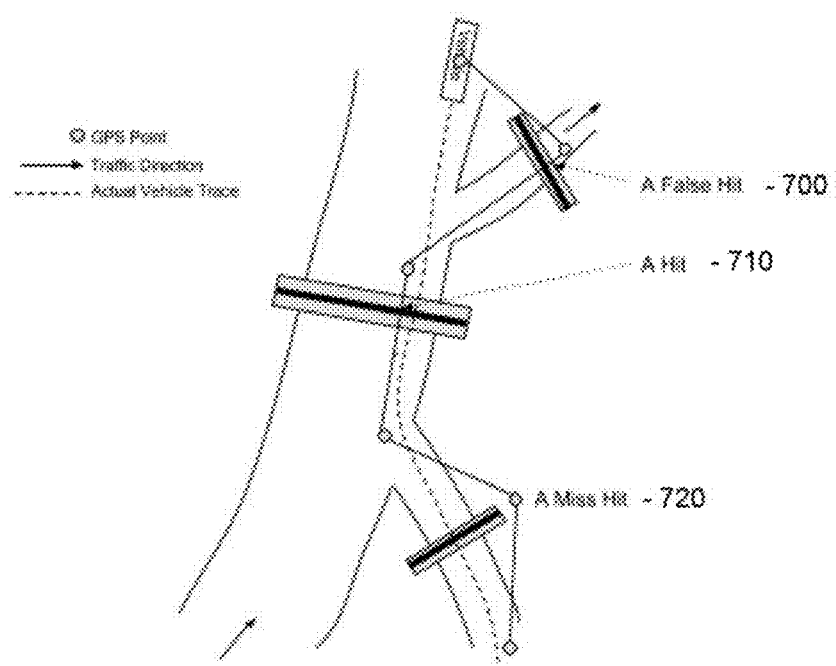
FIG. 7 is a diagram showing how an exemplary system uses an error correction algorithm to correct and account for erroneous GPS location readings.

FIG. 7 shows the various scenarios where erroneous GPS readings could affect the operation of a preferred embodiment of the present system. A hit (710) is when a trip segment created using correct GPS reading data intersects with a gantry segment. On the other hand, a false hit is when trip segment was created using false GPS readings and lead to a false intersection with a gantry. A miss hit is when trip segments created using faulty GPS readings missed the intersection between the actual travel route and a gantry. Error detection and correction becomes critical in order to ensure proper determination and calculation of the toll charges. For example, a miss hit or false hit may be identified and corrected by comparing the trip segments with the information about the nearby gantry and road information.

Although an exemplary embodiment of the system of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by integration of various discrete components such as microprocessing and signal modulation demodulation. Further, although depicted in a particular manner, various modules or blocks may be repositioned without departing from the scope of the current invention. Further, a lesser or greater number of microprocessors may be utilized with the present invention, to provide additional known features to the present invention, and/or to make the present invention more efficient.

What is claimed is:

1. A method of collecting tolls through an app in a mobile device comprising:
   receiving position information of a plurality of toll gantries from a database, wherein said toll gantries comprise a main gantry, an on ramp gantry and an off ramp gantry;
   reading GPS location data from a mobile device;
   creating a plurality of trip segments based on said GPS location data wherein direction of the mobile device is calculated;
   determining whether the mobile device is travelling on a toll road;
   calculating the time when the vehicle is passing through a gantry using the position information of said toll gantries and trip segments;
   calculating toll charges based on said plurality of trip segments and a time when said mobile device travels through said toll gantries;
   communicating with a toll road reinforcement system;
   generating a toll charge transaction;
   notifying user of the mobile device on the toll charges;
   processing payment of the toll charges.

2. The method of claim 1 wherein said toll gantries are virtual gantries.

3. The method of claim 1 wherein said toil gantries are real gantries.

4. The method of claim 1 further comprising a step of error detection that identifies faulty GPS readings of the mobile device's locations.

5. The method of claim 1 wherein the GPS location data includes longitude, latitude, and altitude information.

6. The method of claim 1 further comprising the following steps of handling a toll violation transaction:
   receiving toll violation transaction information;
   matching the violation transaction information with information of existing toll charge transactions;
   recording the matching result in a database;
   notifying the user of the result of the matching of said toll violation transaction and existing toll charge transactions.

7. An automatic toll collection system comprising:
   a GPS reading unit that reads GPS location data from a mobile device;
   a first database table storing the user information of the toll collection system;
   a second database table storing position information of toll gantries, wherein said toll gantries comprise a main gantry, an on ramp gantry and an off ramp gantry;
   a control unit that creates a plurality of trip segments based on said GPS location data and determines whether the mobile device is travelling on a toll road using the position information of said toll gantries and trip segments;
   a toll collecting unit that calculates toll charges based on said plurality of trip segments and a time when said mobile device travels through said toll gantries and notifies user of the mobile device on the toll charge transaction; and
   wherein the toll collecting unit communicates via a network with a toll road reinforcement system or a back-end server.

8. The system of claim 7 wherein said first and second databases tables residing in one database.

9. The system of claim 7 wherein said toll gantries are virtual gantries.

10. The system of claim 7 wherein said toil gantries are real gantries.

11. The system of claim 7 further comprising an error correction unit that identifies faulty GPS readings of the mobile device's locations.

12. The system of claim 7 wherein said GPS location data include longitude, latitude, and altitude information.

13. The system of claim 7 further comprising a toll violation transaction unit that receives toll violation transaction information from said a toll mad reinforcement system, matches said toll violation transaction information with toll charge transactions, and notifies the user of the matching result.

* * * * *